United States Patent
Tran et al.

(10) Patent No.: US 8,499,652 B1
(45) Date of Patent: Aug. 6, 2013

(54) TEST RAMP FOR TESTING MICROACTUATORS USED IN A MULTI-HEAD DISK DRIVE

(75) Inventors: Gregory Tran, Santa Clara, CA (US); Yanning Liu, San Ramon, CA (US); Sivabalan Ganisen, San Jose, CA (US); Mukesh Patel, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 570 days.

(21) Appl. No.: 12/764,800

(22) Filed: Apr. 21, 2010

(51) Int. Cl.
*G01N 19/00* (2006.01)
(52) U.S. Cl.
USPC .......................................... 73/865.9; 324/727
(58) Field of Classification Search
USPC ................. 73/1.15, 105, 865.9; 324/210, 727
See application file for complete search history.

(56) References Cited

U.S. PATENT DOCUMENTS

| | | | |
|---|---|---|---|
| 4,532,802 A | 8/1985 | Yeack-Scranton et al. | |
| 5,447,051 A | 9/1995 | Hanks et al. | |
| 6,094,973 A | 8/2000 | Novotny | |
| 6,510,752 B1 | 1/2003 | Sacks et al. | |
| 6,556,028 B1 * | 4/2003 | Umanskiy et al. | 324/727 |
| 6,861,854 B1 | 3/2005 | Guo et al. | |
| 6,870,377 B2 * | 3/2005 | Thomsen | 324/727 |
| 7,106,552 B2 | 9/2006 | Hirano et al. | |
| 7,124,654 B1 | 10/2006 | Davies et al. | |
| 7,190,547 B2 | 3/2007 | Khurshudov et al. | |
| 7,392,687 B2 | 7/2008 | Huang et al. | |
| 7,423,837 B2 | 9/2008 | Hutsell | |
| 7,502,194 B2 | 3/2009 | Alexander et al. | |
| 7,768,276 B2 * | 8/2010 | Yao | 324/727 |
| 2003/0076121 A1 * | 4/2003 | Guo et al. | 324/727 |
| 2008/0129305 A1 | 6/2008 | Perryman et al. | |

* cited by examiner

*Primary Examiner* — Daniel Larkin

(57) ABSTRACT

A test ramp is disclosed comprising a plurality of planar surfaces, wherein each planar surface comprises at least one impediment. Each impediment is offset along a planar axis from the other impediments, and each impediment is operable to contact part of a respective actuator arm of a disk drive in order to excite a microactuator coupled to the actuator arm.

10 Claims, 5 Drawing Sheets

US 8,499,652 B1

TEST RAMP FOR TESTING MICROACTUATORS USED IN A MULTI-HEAD DISK DRIVE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

As the density of the data tracks increases, a microactuator may be employed in combination with the VCM to improve the tracking performance of the servo system.

Any suitable microactuator may be employed such as a suitable piezoelectric (PZT) actuator. It may be desirable to test the microactuators before being installed into a disk drive so that defective microactuators can be replaced or disabled.

DETAILED DESCRIPTION OF EMBODIMENTS OF THE INVENTION

Figure 1A:
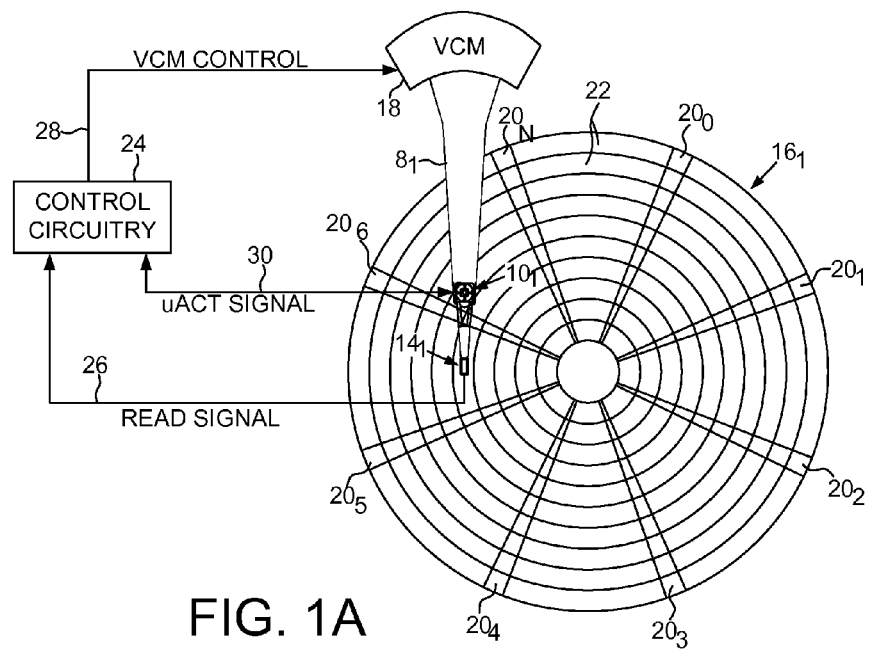
FIGS. 1A and 1B show an actuator arm assembly employed in a disk drive according to an embodiment of the present invention.
Figure 1B:
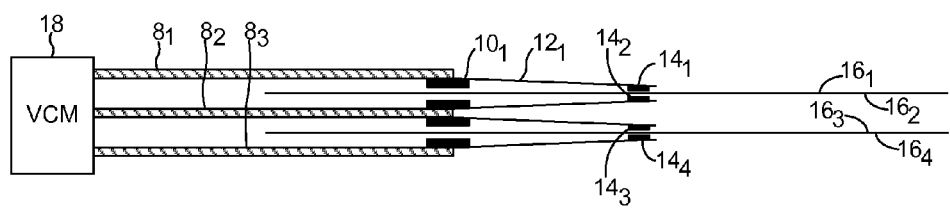
Figure 2A:
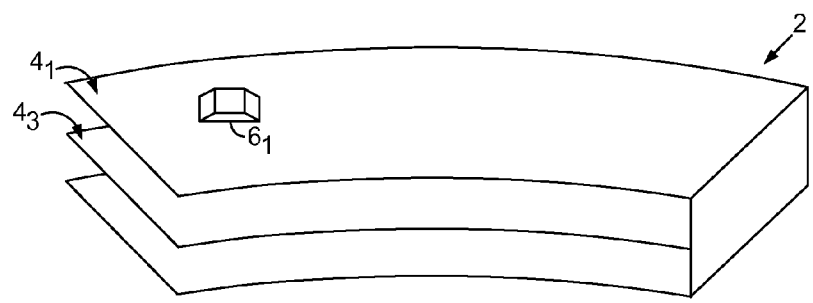
FIGS. 2A-2C show a test ramp according to an embodiment of the present invention comprising an impediment on each planar surface operable to contact part of a respective actuator arm.
Figure 2B:
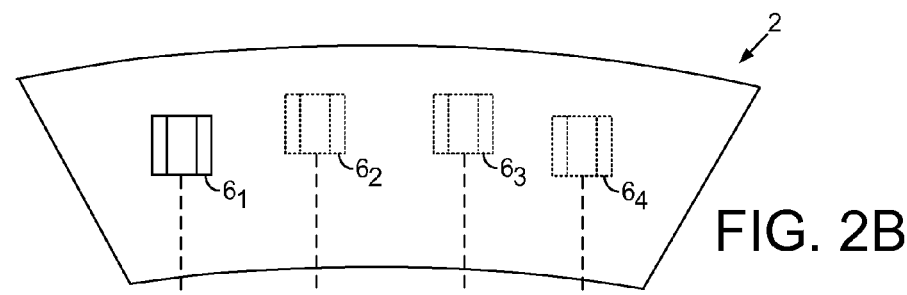
Figure 2C:
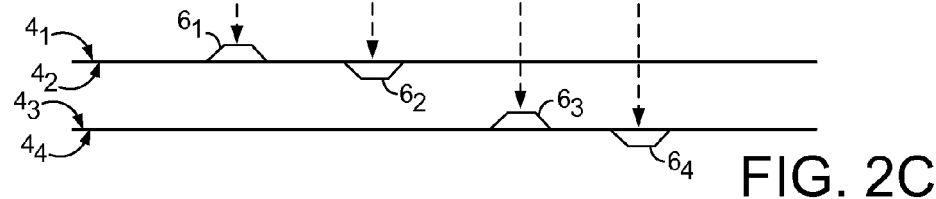

FIGS. 2A-2C show a test ramp 2 according to an embodiment of the present invention comprising a plurality of planar surfaces $4_1$-$4_4$, wherein each planar surface comprises at least one impediment $6_1$-$6_4$. Each impediment is offset along a planar axis from the other impediments, and each impediment is operable to contact part of a respective actuator arm $8_1$-$8_3$ of a disk drive (FIG. 1A) in order to excite a microactuator (e.g., $10_1$) coupled to the actuator arm (e.g., $8_1$).

In the disk drive of FIG. 1A, a suspension (e.g., $12_1$) couples a head (e.g., $14_1$) to a distal end of each actuator arm. The heads $14_1$-$14_4$ are actuated over respective disk surfaces $16_1$-$16_4$ by a voice coil motor (VCM) 18 which rotates the actuator arms $8_1$-$8_3$ about a pivot. A plurality of embedded servo sectors $20_0$-$20_N$ are recorded on each disk surface (e.g., disk surface $16_1$) to define a plurality of data tracks 22, wherein each servo sector comprises suitable position information, such as a track address providing coarse position information and servo bursts providing fine position information. As the head passes over a servo sector, control circuitry 24 demodulates a read signal 26 emanating from the head into a position error signal (PES). The PES is filtered by a suitable compensation filter to generate a control signal 28 applied to the VCM 18. The VCM 18 rotates the actuator arm about the pivot in order to position the head radially over the disk in a direction that reduces the PES. In order to increase the bandwidth of the servo system to thereby increase the data tracks per inch (TPI), the control circuitry 24 also generates a microactuator control signal 30 applied to the microactuator coupled to the actuator arm in order to provide fine position control of the head while tracking the centerline of a target data track.

Any suitable microactuator may be employed in the embodiments of the present invention, such as one or more piezoelectric actuators having a shape that deforms in response to an applied electrical signal (e.g., an applied current). In the embodiment of FIG. 1A, the microactuator couples the suspension to the actuator arm in order to rotate the suspension about a pivot to servo the head over fine movements. However, the microactuator may be located at any suitable location on the actuator arm, such as a microactuator which couples a gimbal to the suspension, wherein the head is mounted to the gimbal.

Figure 2D:
FIG. 2D shows an embodiment of the present invention wherein an amplitude and/or polarity of a microactuator signal is evaluated when the actuator arm contacts the impediment to determine whether microactuator is defective.
Figure 3:
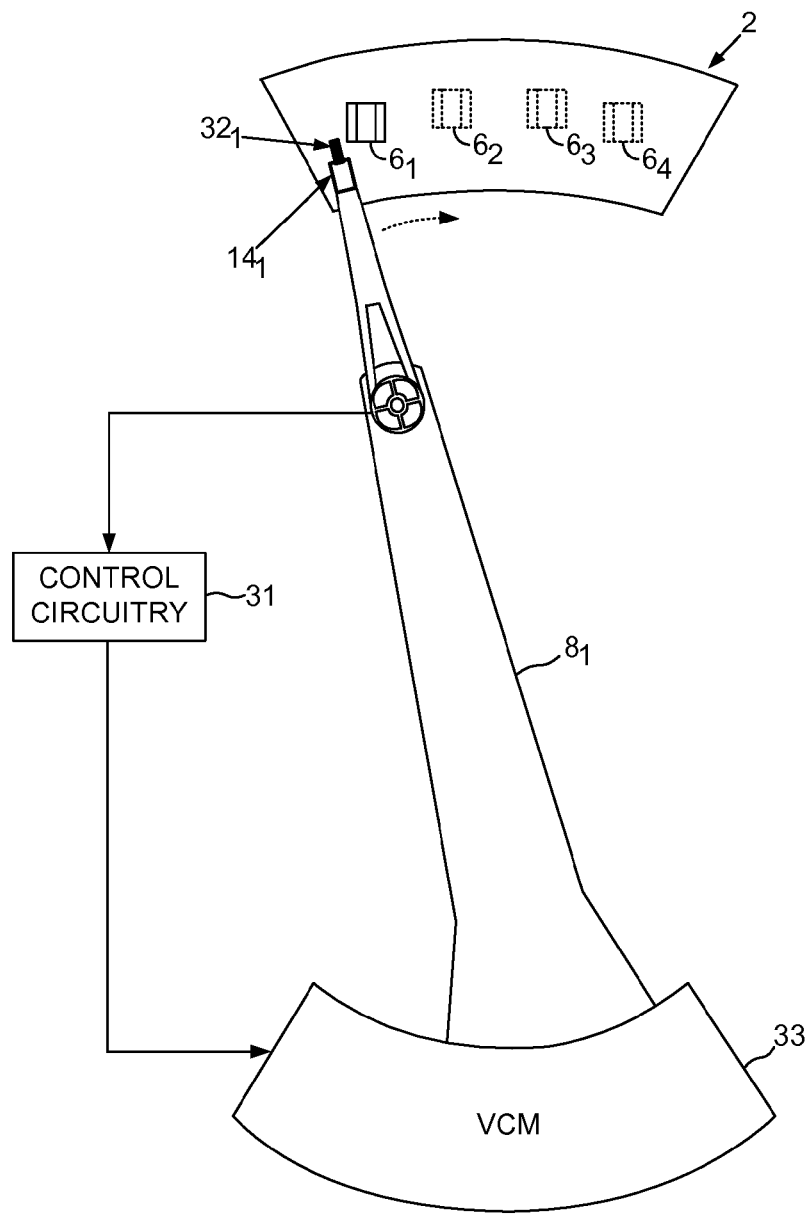
FIG. 3 shows a test system that rotates actuator arms about a pivot in order to move a distal end of the actuator arms in an arcuate path over a test ramp according to an embodiment of the present invention.
Figure 4A:
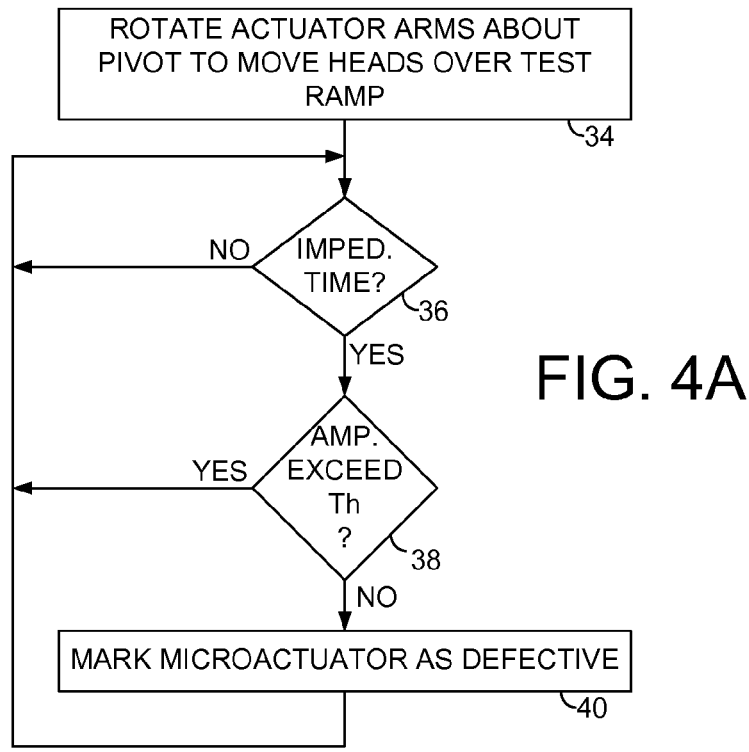
FIG. 4A is a flow diagram according to an embodiment of the present invention wherein an amplitude of a microactuator signal is evaluated to determine whether the microactuator is defective.

In one embodiment, prior to installing the actuator arm assembly into a disk drive, the test ramp 2 of FIG. 2A is used to test the microactuators. FIG. 3 shows a test system according to an embodiment of the present invention comprising control circuitry 31 for testing the microactuators which is further understood with reference to the flow diagram of FIG. 4A. The actuator arms are rotated about a pivot in order to move a distal end of the actuator arms in an arcuate path over a test ramp (step 34). In the embodiment of FIG. 3, the control circuitry 31 controls a VCM 33 to rotate the actuator arms about a pivot, wherein the VCM 33 may be the same as employed in the disk drive of FIG. 1A, or a different VCM (e.g., a test system VCM). As each actuator arm contacts a respective impediment (step 36), an amplitude of a microactuator signal is evaluated (step 38) to determine whether the corresponding microactuator is defective (step 40). For example, if the amplitude of the microactuator signal does not exceed either a positive threshold (Th+) or a negative threshold (Th−), then the microactuator is considered defective. This is illustrated in FIG. 2D wherein the third microactuator $10_3$ is considered defective since the amplitude of its output does not exceed either the positive or negative threshold when its actuator arm contacts the third impediment $6_3$. As shown in FIG. 4A, if the actuator arm has not contacted a respective impediment (NO in step 36) or if the amplitude exceeds the threshold (YES in step 38), the embodiment of FIG. 4A returns to step 36.

Any suitable technique may be employed to determine when each actuator arm is expected to contact its respective impediment on the planar surfaces of the test ramp. In one embodiment, a timer may be employed to time when each actuator arm is expected to contact its respective impediment relative to the velocity of the actuator arms over the test ramp. In addition, any suitable part of the actuator arm may contact the impediment, wherein in the embodiment of FIG. 3, a tab $32_1$ extending from the distal end of the actuator arm contacts the impediment. The tabs may be used during normal operation of the disk drive shown in FIG. 1A in order to unload the actuator arms onto a ramp extending over an outer edge of each disk (not shown).

Figure 4B:
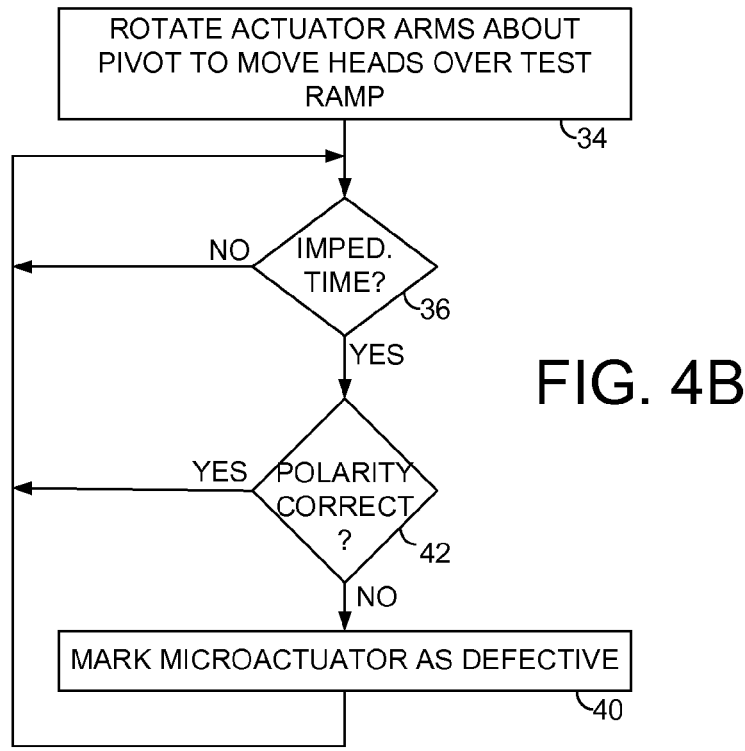
FIG. 4B is a flow diagram according to an embodiment of the present invention wherein a polarity of a microactuator signal is evaluated to determine whether the microactuator is defective.

FIG. 4B shows an embodiment of the present invention wherein as each actuator arm contacts a respective impediment (step 36), a polarity of a microactuator signal is evaluated (step 42) to determine whether the corresponding microactuator is defective (step 40). In one embodiment, the polarity of the microactuator signal changes based on the configuration. For example, a positive control signal may rotate a microactuator in a clockwise or counterclockwise direction such that the corresponding output signal when testing the microactuator will have either a positive or negative polarity. In one embodiment, the top and bottom microactuators connected to the same actuator arm may be configured to rotate in opposite directions when a control signal (positive or negative) is simultaneously applied to both microactuators. Rotating the microactuators in opposite directions may help attenuate one or more vibration modes of the actuator arm. Accordingly, in one embodiment when testing the microactuators using the test ramp 2 of FIG. 2A, the polarity of the microactuator signals are evaluated to verify that the microactuators are configured correctly. Referring again to FIG. 2D, the correct polarity of the microactuators is illustrated as being reversed for each microactuator such that the microactuator signals should alternately exceed the positive threshold and then the negative threshold. If for example the microactuator signal exceeds the wrong threshold, a miss-configuration of the microactuators is detected (i.e., a defect is detected). As shown in FIG. 4B, if the actuator arm has not contacted a respective impediment (NO in step 36) or if the polarity is correct (YES in step 42), the embodiment of FIG. 4B returns to step 36.

In one embodiment, operation of the microactuators may be tested by rotating the actuator arms in two directions. Referring again to FIG. 3, the microactuators may be tested while the VCM rotates the actuator arms in a first (clockwise) direction, and then the microactuators may be tested while the VCM rotates the actuator arms in an opposite (counterclockwise) direction. In one embodiment, when the actuator arms are rotated in the opposite direction, the polarity of the resulting microactuator signals reverses due to the displacement being in the opposite direction. In another embodiment, each microactuator may comprise two actuating elements (e.g., two piezos) each responsible for moving the head in an opposite direction. In this embodiment, the first actuating element may be tested when rotating the actuator arms in the first (clockwise) direction, and the second actuating element may be tested when rotating the actuator arms the opposite (counterclockwise) direction.

Figure 5A:
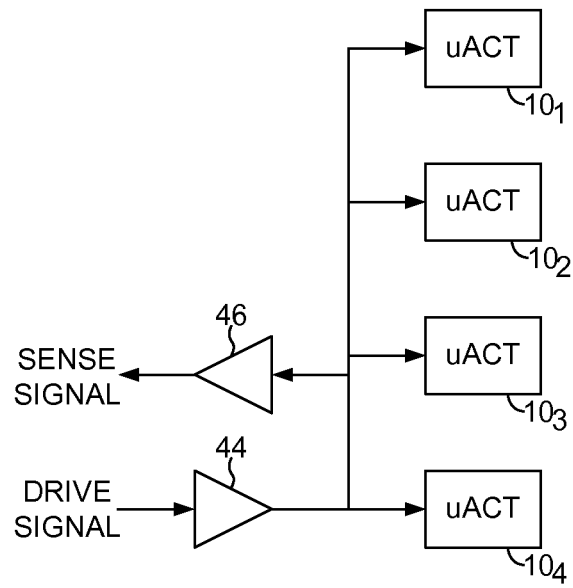
FIG. 5A shows an embodiment of the present invention wherein the outputs of the microactuators are wire-ORed.

Any suitable control circuitry may be employed to generate the control signals applied to the microactuators as well as the output signal generated when testing the microactuators. FIG. 5A shows an embodiment of the present invention wherein a first amplifier 44 generates a control signal that is simultaneously applied to all of the microactuators $10_1$-$10_4$. In this embodiment, all of the microactuators (or a bank of the microactuators) may move the corresponding heads even though only one of the heads may be active (during a write or read operation). Similarly, when testing the microactuators their output signals are wire-ORed and then amplified by a second amplifier 46 to generate the evaluated microactuator signal. Offsetting the impediments $6_1$-$6_4$ on the respective planar surfaces $10_1$-$10_4$ of the test ramp 2 as shown in FIGS. 2A-2C enables the test system to distinguish the microactuators even though their outputs are wire-ORed. As the VCM rotates the actuator arms about the pivot as shown in FIG. 3, the wired-OR microactuator signal is evaluated over multiple time slots each corresponding to a respective microactuator as shown in FIG. 2D.

Figure 5B:
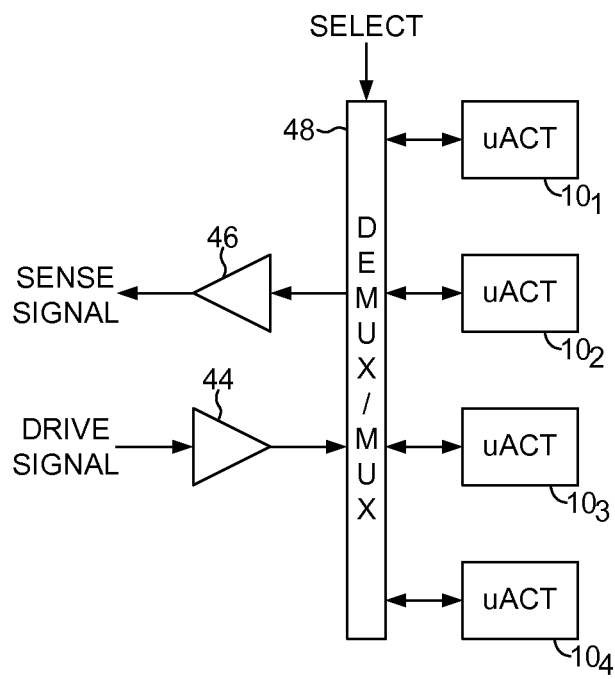
FIG. 5B shows an embodiment of the present invention wherein the outputs of the microactuators are multiplexed.

FIG. 5B shows an alternative embodiment of the present invention wherein the control signal output by the first amplifier 44 is applied to a target microactuator using a suitable de-multiplexer 48. During the testing procedure, the output of a target microactuator may be selected using a suitable multiplexer 48 and applied to the amplifier 46 to generate the evaluated microactuator signal.

Any suitable control circuitry may be employed to implement the flow diagrams in the embodiments of the present invention, such as any suitable integrated circuit or circuits. In one embodiment, the control circuitry comprises a microprocessor executing instructions, the instructions being operable to cause the microprocessor to perform the steps of the flow diagrams described herein. The instructions may be stored in any suitable computer-readable medium, such as on a disk of a disk drive, a compact disk, or in a semiconductor memory (e.g., a Flash). In yet another embodiment, the control circuitry may comprise suitable logic circuitry, such as state machine circuitry.

What is claimed is:

1. A method of testing a plurality of microactuators of a disk drive, wherein the disk drive comprises a plurality of disk surfaces, an actuator arm is actuated over each disk surface, and each actuator arm comprises a microactuator, the method comprising:
    rotating the actuator arms about a pivot in order to move a distal end of the actuator arms in an arcuate path over planar surfaces of a test ramp, wherein each planar surface comprises at least one impediment, and each impediment offset along a planar axis from the other impediments; and
    as each actuator arm contacts a respective impediment, evaluating a microactuator signal to determine whether the corresponding microactuator is defective.

2. The method as recited in claim 1, further comprising determining one of the microactuators is defective when an amplitude of the microactuator signal does not exceed a threshold.

3. The method as recited in claim 1, further comprising determining one of the microactuators is defective when a polarity of the microactuator signal does not match an expected polarity.

4. The method as recited in claim 1, further comprising wire-ORing an output from each microactuator to generate the microactuator signal.

5. The method as recited in claim 1, further comprising evaluating the microactuator signal over time relative to a velocity of the actuator arms to determine when each actuator arm should contact the respective impediment of the test ramp.

6. A test system for testing a plurality of microactuators of a disk drive, wherein the disk drive comprises a plurality of disk surfaces, an actuator arm is actuated over each disk surface, and each actuator arm comprises a microactuator, the test system comprising a test ramp including a plurality of planar surfaces, wherein:
    each planar surface comprising at least one impediment; and
    each impediment offset along a planar axis from the other impediments, the test system further comprising control circuitry operable to:

rotate the actuator arms about a pivot in order to move a distal end of the actuator arms in an arcuate path over the planar surfaces of the test ramp; and as each actuator arm contacts a respective impediment, evaluate a microactuator signal to determine whether the corresponding microactuator is defective.

7. The test system as recited in claim 6, wherein the control circuitry is operable to determine one of the microactuators is defective when an amplitude of the microactuator signal does not exceed a threshold.

8. The test system as recited in claim 6, wherein the control circuitry is operable to determine one of the microactuators is defective when a polarity of the microactuator signal does not match an expected polarity.

9. The test system as recited in claim 6, wherein an output from each microactuator is wire-ORed to generate the microactuator signal.

10. The test system as recited in claim 6, wherein the control circuitry is operable to evaluate the microactuator signal over time relative to a velocity of the actuator arms to determine when each actuator arm should contact the respective impediment of the test ramp.

* * * * *